United States Patent [19]

De Benedetti

[11] 4,080,990
[45] Mar. 28, 1978

[54] SIX-WAY DEVIATOR VALVE FOR LIQUIDS

[75] Inventor: Franco De Benedetti, Turin, Italy

[73] Assignee: Gilardini S.p.A., Turin, Italy

[21] Appl. No.: 703,871

[22] Filed: Jul. 9, 1976

[30] Foreign Application Priority Data

Jul. 18, 1975 Italy .................. 68881 A/75

[51] Int. Cl.² ............................................. F16K 11/16
[52] U.S. Cl. ................................ 137/599.1; 137/601;
137/625.44; 210/340; 251/80; 251/228;
251/298
[58] Field of Search .............. 137/599.1, 601, 625.29,
137/625.31, 625.44; 210/340, 341; 251/80, 228,
298, 299

[56] References Cited

U.S. PATENT DOCUMENTS

| 678,001 | 7/1901 | Merrill | 210/341 |
|---|---|---|---|
| 1,408,822 | 3/1922 | Mosher | 210/341 |
| 2,068,468 | 1/1937 | Phillips | 210/340 X |
| 2,681,736 | 6/1954 | Voorheis | 210/341 |
| 2,767,738 | 10/1956 | Pottmeyer | 137/625.44 |
| 3,935,108 | 1/1976 | Forgues | 210/340 |

FOREIGN PATENT DOCUMENTS

| 34,058 | 1/1925 | Denmark | 251/228 |
|---|---|---|---|
| 48,678 | 6/1940 | Netherlands | 137/625.44 |

Primary Examiner—Robert G. Nilson
Attorney, Agent, or Firm—Ladas, Parry, Von Gehr, Goldsmith & Deschamps

[57] ABSTRACT

A six-way deviator valve for liquids, of the type comprising two three-way valves in the same housing separated by a dividing baffle, each of the three-way valves possessing one permanently open nozzle for connection to a main pipe, and two internally closable nozzles for connection to secondary pipes, the two closable nozzles being closed by a suitable obturator element, is described. Each of the two obturator elements comprises faces mounted on support elements and arranged to rest on corresponding seats formed on the internal extremities of the two closable nozzles, the obturator element also being rotatable about a fixed axis of rotation and rotated by a rotating drive spindle located inside said housing, the drive spindle being rotated by external means by way of linkages.

11 Claims, 9 Drawing Figures

SIX-WAY DEVIATOR VALVE FOR LIQUIDS

BACKGROUND OF THE INVENTION

This invention relates to a six-way deviator valve, arranged for series mounting in a liquid pipe, and able to connect two different paths for the liquid in series with this pipe, particularly two separate filter units together with which the valve forms a duplex filter.

In many technical applications it is notably necessary to deviate a stream of a given liquid from a main pipe to make it take a given secondary path for determined technical reasons, and then return the same liquid to the main pipe.

Furthermore there are notably cases in which there are two such secondary paths in parallel, and the fluid must take either the first or the second, or possibly divide itself and take both paths.

One example of application of this type are the so-called duplex filters, each consisting of two separate filter units and a six-way deviator valve, the purpose of which is to convey the liquid either to the first or the second unit, so that when one of the two filter units has to be subjected to maintenance and cleaning, it may be isolated and the fluid deviated to the other filter unit.

Cases of this type occur for example in lubricant circulation systems of large diesel engines for naval applications, and in many other varied technical applications.

SUMMARY OF THE INVENTION

The present invention provides a six-way deviator valve for liquids, of the type comprising two three-way valves in the same housing separated by a dividing baffle, each of the three-way valves possessing one permanently open nozzle for connection to a main pipe, and two internally closable nozzles for connection to secondary pipes, the two closable nozzle being closed by a suitable obturator element, wherein each of the two obturator elements comprises faces mounted on support elements and arranged to rest on corresponding seats formed on the internal extremities of the two closable nozzles, the obturator element also being rotatable about a fixed axis of rotation and rotated by a rotating drive spindle located inside said housing, the drive spindle being rotated by external means by way of linkages.

BRIEF DESCRIPTION OF THE DRAWINGS

The present invention will be more evident by the description given hereinafter of a particular embodiment with reference to the accompanying drawings, in which.

DETAILED DESCRIPTION OF THE INVENTION

Figure 1:
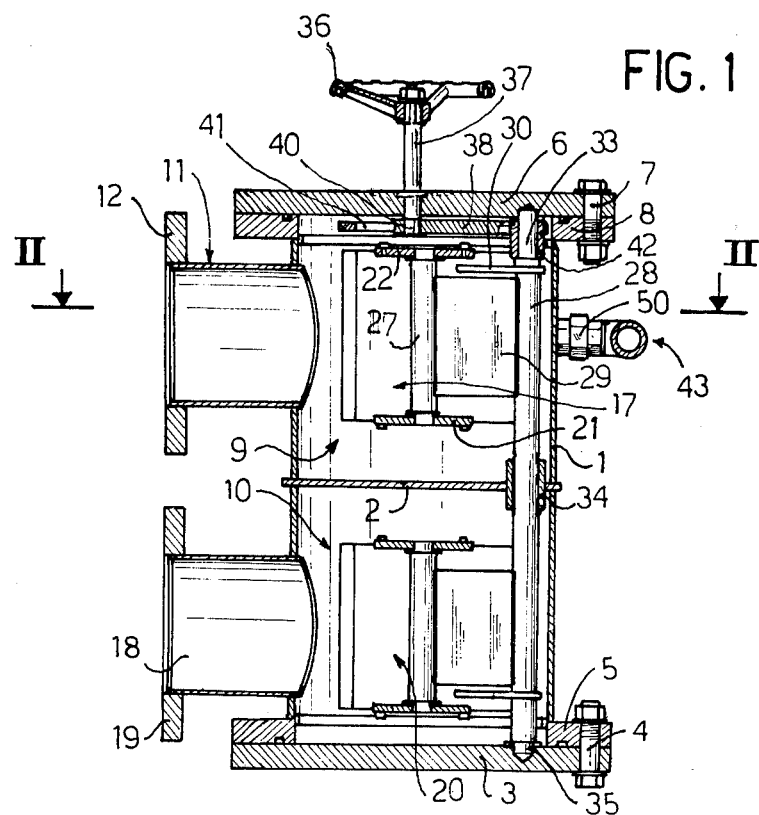
FIG. 1 is a section parallel to the valve axis.

The valve according to the invention (FIGS. 1, 2) consists of a substantially cylindrical housing 1 divided internally by a dividing baffle 2 and closed lowerly by a cover 3 fixed by bolts 4 to a flange 5, and further closed upperly by a cover 6 fixed by bolts 7 to a flange 8.

The internal valve compartment is thus divided into two separate parts, an upper part 9 and a lower part 10. The upper chamber 9 is connected to the outside through a first nozzle 11 provided with a flange 12 and opening into the chamber 9 by way of an unclosable inlet port, and also through a second and third nozzle, 13 and 14 respectively, which open into the chamber 9 by way of ports closable by the sides 15 and 16 respectively of an obturator element 17. The lower chamber 10 is connected to the outside through equally positioned analogous nozzles, of which only the unclosable nozzle 18 provided with a flange 19 is visible in FIG. 1. The non-visible nozzles 13b and 14b lie under the nozzles 13 and 14 respectively. The chamber 10 also contains its own obturator element 20, identical to the obturator element 17, and therefore only this latter will be described in detail.

The obturator element 17 (see FIGS. 1, 2, 4, 5) is composed of two flat faces 15 and 16 mounted with a contained angle and retained in this relative position by two lateral plates 21 and 22, fixed by bolts 23.

Seal elements 24 and 25 retained by bolts 26 are mounted on each of the two flat faces 15 and 16. The plates 21 and 22 are pivoted on a shaft 27 by way of terminal pivots 27' and 27", so that the plates 21 and 22 may rotate about the shaft 27.

The shaft 27 is connected to a driven spindle 28 by a resilient blade 29 rigidly coupled both to the shaft 27 and to the spindle 28.

A stop element 30 is rigidly keyed on the spindle 28 and has its edges 31 and 32 at a short distance from the inner walls of the flat faces 16 and 15. The spindle 28 is rotatable with respect to the housing 1, rotating in the bush 34 and on the pivots 33 and 35, and is situated in the housing 1 on the side opposite the nozzles 11 and 18. A handwheel 36 keyed on a shaft 37 is rigidly connected to an eccentric 38 (FIGS. 1 and 3) by a square coupling hole 39 formed in the eccentric 38, a square sectioned end of the shaft 37 being inserted into this hole. The eccentric 38 is adapted to co-operate with a link block 40 keyed rigidly on the spindle 28 by way of a coupling bush 42.

O is the centre of rotation of the eccentric 38, S the centre of rotation of the link block 41, C the centre of the circle formed by the peripheral profile of the eccentric 38 and P is the point of thrust contact between the eccentric 38 and link block 41.

Figure 2:
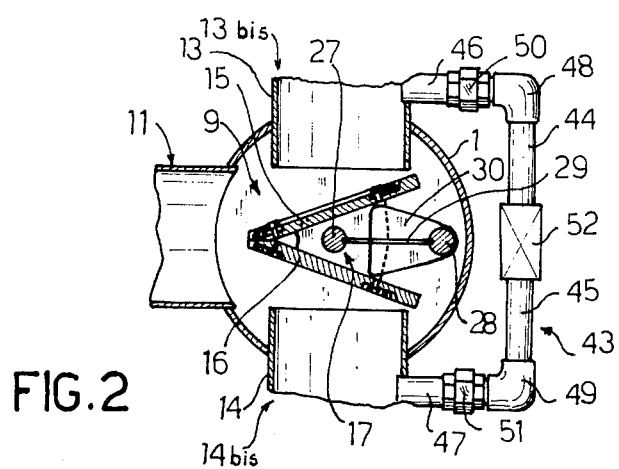
FIG. 2 is a section perpendicular to the axis of the valve housing.

A connecting duct 43 (FIGS. 1 and 2) composed of straight pipe portions 44, 45, 46, 47 elbows 48 and 49 and threaded connectors 50 and 51 connect the interiors of the nozzles 13 and 14 together, by way of a shut-off valve 52, as indicated diagrammatically in FIG. 2.

Figure 6:
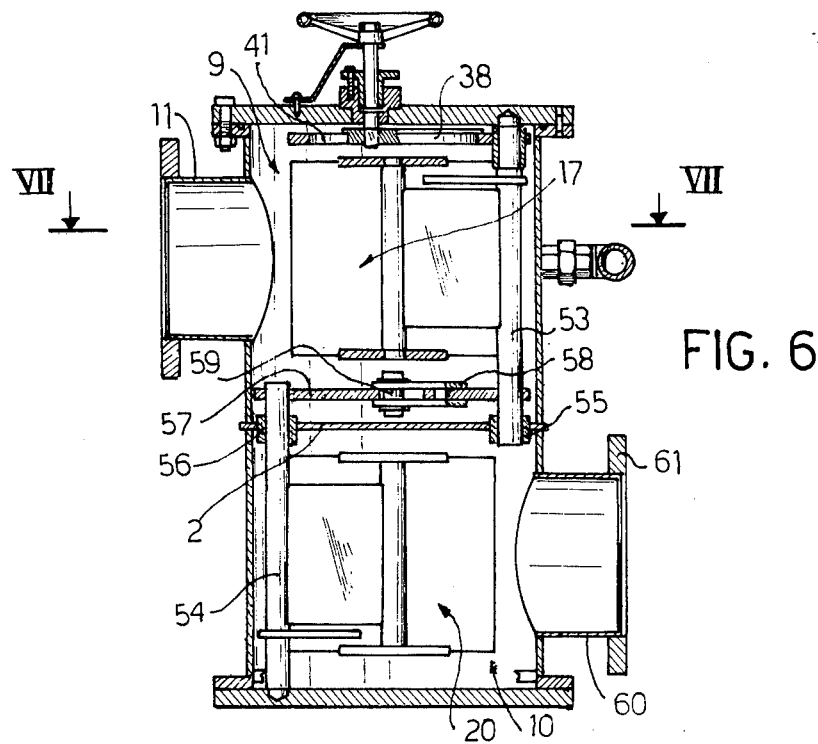
FIG. 6 is a section through a first constructional modification of the valve of FIG. 1, taken parallel to its axis.
Figure 7:
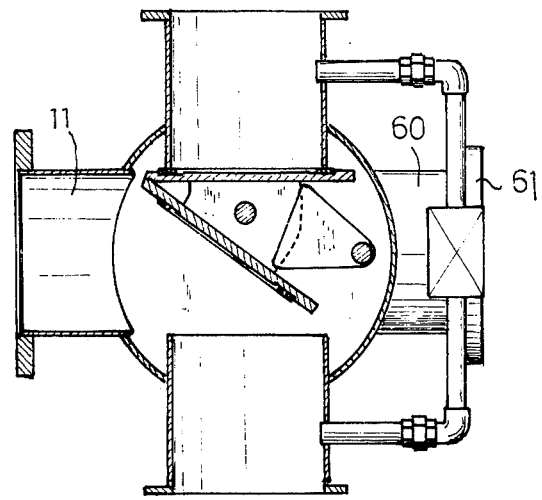
FIG. 7 is a view of the valve of FIG. 6 perpendicular to its axis.

FIGS. 6 and 7 show a first modification of the valve of FIGS. 1 and 2. Corresponding parts are indicated by the same reference numerals. The valve of FIGS. 6 and 7 comprises a drive spindle divided into two portions 53 and 54, one for each of the two chambers 9 and 10 into which the valve is divided, and disposed on opposite sides of the centre axis of the valve.

The dividing baffle correspondingly comprises two bosses, 55 and 56 respectively, which support the ends of the two spindle portions 53 and 54.

Linkage means of known type, indicated basically by the rods 57 and 58, joined centrally by the pin 59, transmit rotatory motion from the spindle portion 53 to the spindle portion 54. Instead of the nozzle 18 of FIG. 1, FIG. 6 shows a nozzle 60 provided with a flange 61 and situated on the opposite side of the housing 1, so that the nozzle 60 and spindle portion 54 in the chamber 10 are positioned on opposite sides of the housing 1.

Figure 8:
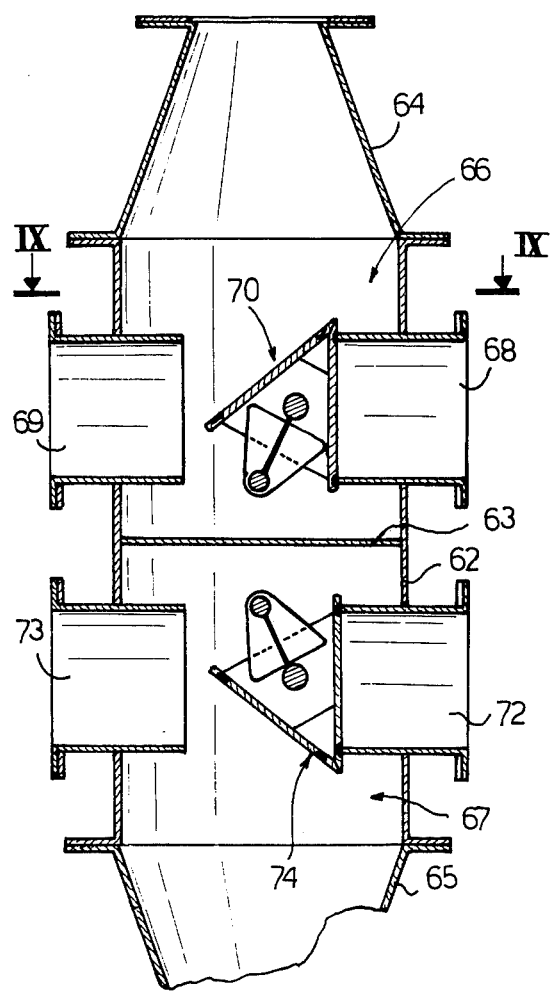
FIG. 8 is a longitudinal section through a second constructional modification of the valve of FIG. 1.
Figure 9:
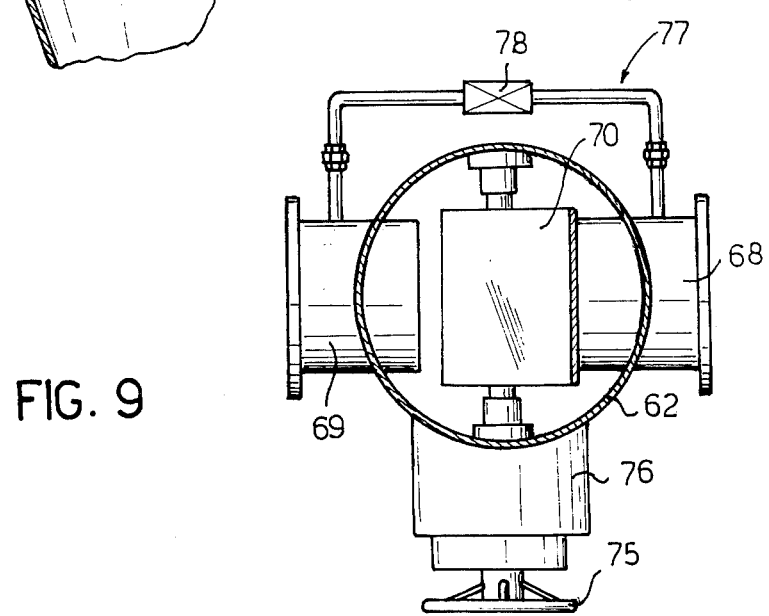
FIG. 9 is a cross-section through the valve of FIG. 8.

FIGS. 8 and 9 show a second modification of the valve of FIGS. 1 and 2, and includes a cylindrical housing 62 divided internally by a baffle 63. Two conical nozzles 64 and 65, disposed axially with respect to the housing 62 are flanged to the two ends of the housing 62. The baffle 63 divides the interior of the valve into two zones 66 and 67. The zone 66 is connected to the outside both by way of the unclosable conical nozzle 64 and by way of the nozzles 68 and 79, which are internally closable by the obturator 70 indentical with the device 17 of FIGS. 4 and 5. The zone 67 is connected to the outside by way of the nozzles 72 and 73 closable by the obturator element 74, identical with the corresponding element 70, and substantially analogous to the element 17. The two obturators 70 and 74 are rotated simultaneously by the handwheel 75 by way of transmission members not shown in the figure, and contained in the nox 76.

The nozzles 68 and 69 are connected by a connecting pipe 77 in which a valve 78, indicated diagrammatically, is series mounted.

The operation of the valve described heretofore is as follows.

With reference to FIGS. 1 and 2, the six-way valve is substantially composed of the two three-way valves corresponding to the zones 9 and 10 divided by the baffle 2. One of the zones 9 or 10 is assigned to receiving the liquid from the main pipe and deviating it towards one of the two secondary pipes, and the other zone is correspondingly assigned to receiving the liquid from the secondary pipe and returning it to the main pipe.

It will be supposed, for example, that zone 9 receives the liquid from the main pipe and zone 10 returns the liquid to the main pipe.

The main pipe, not shown, is connected by the flange 12 to the nozzle 11, by which the liquid is fed to the valve, and by the flange 19 to the nozzle 18, by which the liquid is received from the valve. The liquid which enters the zone 9 may be fed to the nozzle 13 or to the nozzle 14, or to both. This latter case occurs when, as shown in FIG. 2, the obturator 17 is at rest in an intermediate position between the two nozzles 13 and 14, so that neither of these two nozzles is closed. The obturator 17 is mounted such that the edge of the angle contained by its two faces 15 and 16 is directed towards the liquid inlet nozzle 11, so that the faces 15 and 16 act in a hydrodynamically efficient manner as plates for dividing the liquid stream and deviating it towards the outlet nozzles 13 and 14. If for example it is required to close the nozzle 13 in order to deviate the stream towards the nozzle 14, the handwheel 13 must be rotated. This rotation (see FIG. 3) causes the eccentric 38 to rotate about the centre 0 of the hole 39, so rotating the link block 41 about the axis of the drive spindle 28, which is rigid with the link block 41.

In this manner the spindle 28 is rotated, in this case in a direction such that the face 13 of the obturator 17 approaches the inner extremity of the nozzle 13. As the spindle 28 rotates, the blade 29 rigid with the spindle 8 also rotates, so moving the shaft 27. The sides 21 and 22 which support the faces 15 and 16 are pivoted to the shaft 27, and thus the face 15 approaches the extremity of the nozzle 13.

During the final stage of this approach stroke, the seal gaskets 25 disposed on the face 15 come into contact with the extreme edge of the nozzle 13, so ensuring the necessary hydraulic seal. As the sides 21 and 22, and correspondingly the faces 15 and 16 are rotatable about the shaft 27, the face 15 is free to move into a position parallel with the extreme edge of the nozzle 13, against which it will rest, to give uniform closure contact along the entire contact perimeter.

In this manner the liquid can only enter the nozzle 14 and only flow through the pipe, or in a specific case the filter, connected to it. This pipe or filter (not shown) is connected at its outlet to the closable nozzle 14b which is not visible in FIGS. 1 and 2, but lies under the nozzle 14 and is situated in an analogous position within zone 10. In this maner the pipe, or filter, the inlet of which is connected to the nozzle 14, has its outlet connected to the nozzle 14b, and likewise the nozzles 13 and 13b are interconnected.

The nozzles 13b and 14b are closable by the obturator 20, shown in FIG. 1.

The parts are mounted in such a manner that when nozzle 13 is closed, nozzle 13b is also closed, and when nozzle 14 is closed, nozzle 14b is also closed.

In the case under examination, the liquid which leaves through the nozzle 14 towards the secondary pipe or filter re-enters through the nozzle 14b and, passing through the zone 10, is returned to the main duct through the nozzle 18. The pressures in the zones 9 and 10 may differ only by the pressure drop produced by the passage through the connected secondary pipe. The other secondary pipe, i.e. that connected between the nozzles 13 and 13b, is unconnected and may therefore be disassembled and subjected to maintenance.

The gaskets of the obturators 17 and 20 which cooperate with these latter in ensuring a hydraulic seal are forced against the corresponding support seats of the nozzles 13 and 13b respectively by the pressure in the zones 9 and 10. When the connected pipe or filter is to be disconnected from the hydraulic circuit and that between the nozzles 13 and 13b connected in its place, the following operations are necessary. The valve 52 is opened to connect the two secondary pipes or filters to the internal chambers 9 and 10 of the valve by way of the connection duct formed by the portions 46, 48, 44, 45, 49 and 47, so as to equalise the pressure on the faces of the obturators 17 and 20. The drive spindle 28 is then rotated by rotating the handwheel 36, so as to move the obturators 17 and 20 into positions of closure of the nozzles 14 and 14b.

If the pressures are not equalised by opening the valve 52 before this operation, rotation of the spindle 28 is not possible because the pressure difference across the faces of the obturators 17 and 20 does not generally allow them to be displaced from the nozzles closed by them.

As it is possible for an attempt to be made to operate the deviator valve in error without first opening the valve 52, the possibility of fracture or permanent deformation of any weak points of the linkage connecting the handwheel 36 to the closure surfaces of the obturators 17 and 20 must be prevented.

In the present case, the weak point (see FIGS. 4 and 5) is the resilient blade 29, the bending of which should therefore be limited. This is achieved by the stop element 30, the edges 31 and 32 of which come into direct thrust contact with the faces 15 and 16 of the obturator 5 when the blade 29 has been bent by the maximum desired amount. A resilient blade of the type indicated by the reference numeral 29 must be included in each obturator 17 and 20 because during a closure operation their gaskets do not come simultaneously into contact with the corresponding support seats on the nozzles due to constructional inaccuracy. If the drive spindle were rigidly coupled to the closure faces, only the obturator whose face arrived first against its seat would completely close its nozzle. The presence of resilient blades of the type indicated by the reference numeral 29 allows further rotation of the control spindle 28, so enabling the second obturator to also completely close.

The operation of the modification shown in FIGS. 6 and 7 is substantially analogous to the operation of the valve shown in FIGS. 1 and 2, as previously described, the only difference being the different position of the liquid outlet nozzle 18 and of the spindle portion 54 of the corresponding obturator. The operation of the modification shown in FIGS. 8 and 9 is substantially analogous to that previously described, the only difference with respect to the valve shown in FIGS. 1 and 2 being due to the arrangement of the parts, in particular the liquid inlet and outlet nozzles 64 and 65, the obturators 70 and 74 and the relative control members, i.e. the handwheel 75 and box 76.

All the modifications heretofore described may be driven by a linkage comprising the eccentric 38 and the corresponding link block 41.

The eccentric 38 and link block 41 form a linkage which may be made irreversible if suitably proportioned. In such a case, the link block 41 may be made to rotate about its centre of rotation S by a rotation of the eccentric 38 about its axis of rotation O, but the reverse operation cannot occur, i.e. the eccentric 38 cannot be rotated about O by a rotation of the link block 41 about S.

Figure 3:
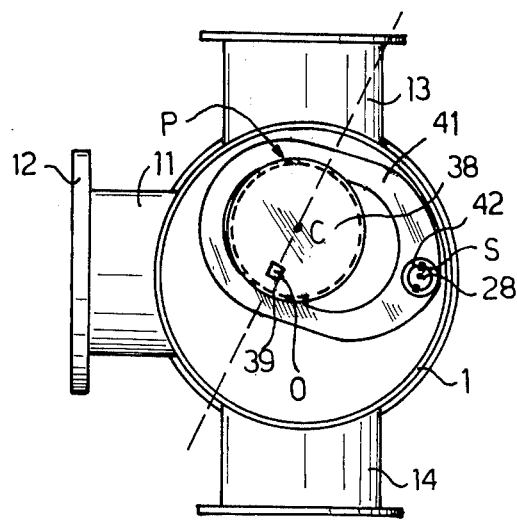
FIG. 3 is a view of an irreversible control mechanism for the valve.
Figure 4:
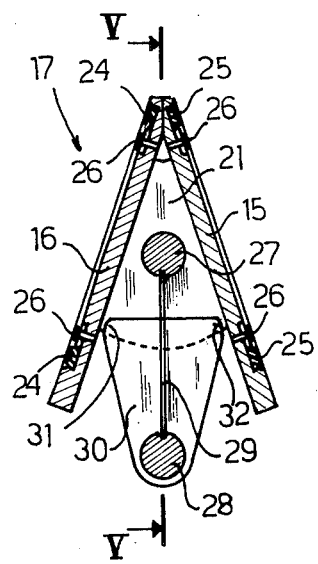
FIG. 4 is a side view of one of the mobile obturator elements of the valve.
Figure 5:
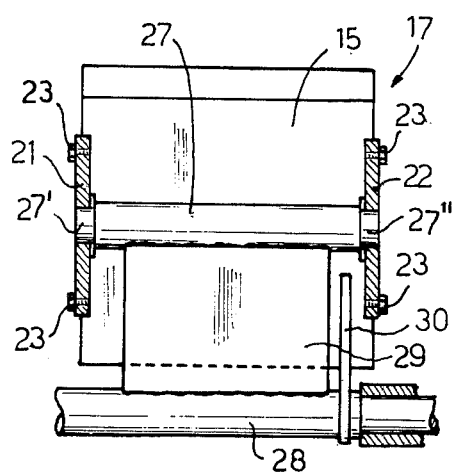
FIG. 5 is a side sectional view of the obturator element of FIG. 4.

In the case shown in FIG. 3, the link block 41 is provided internally with parallel guide walls and the eccentric is circular, the centre of the circle being indicated by C.

The point of contact between the link block and the eccentric is indicated by P (FIG. 3).

During most of the drive rotation of the eccentric 38 about the point O, the point of contact P remains in the semi-plane which does not contain the point S, the two semi-planes concerned being those into which the straight line through points O and C divides the plane of FIG. 3.

If the linkage is proportioned so that at the ends of the drive stroke the point P falls in the semi-plane containing the point S, the mechanism is irreversible, i.e. the reverse motion cannot take place by exerting a corresponding rotation action at S because the force which the link block 41 exerts at P on the eccentric 38 will not tend to move the eccentric backwards, but instead to push it further forwards, as the force exerted at P, and which passes through the centre C because of the geometrical properties of the circle, tends to rotate the eccentric about O in the same direction as the previous direct operation.

The valve according to the invention has the following advantages over valves of known type:

- as the internal obturators are rotated by rotating a handwheel, reference marks for indicating which of the two directions of operation corresponds to the required direction of deviation are no longer basically necessary;
- the liquid path through the valve is extremely simple and short, with consequently low pressure drops. Furthermore the flow is properly guided by the presence of the flat faces of the obturators close to the nozzles;
- the dividing baffle which divides the two three-way valves which make up the six-way valve is subjected only to the small pressure difference across the ends of the secondary pipe or filter, and may therefore be thin and light;
- the various component parts of the valve are all very simple, and of easy and economical construction.

What we claim is:

1. A six-way deviator valve for fluids, comprising:
a cylindrical housing defining a central axis;
a baffle extending transversely to said central axis and dividing the interior of said housing into first and second cylindrical chambers;
a first set of three nozzles, each of which nozzles provides an hydraulic communication between the exterior of the housing and the interior of said first chamber, the nozzles defining respective axes, the axes of first and second nozzles of said first set being coincident and extending orthogonally to said central axis of the housing and the axis of the third nozzle of said first set being orthogonal to the axes of the first and second nozzles of the first set;
a second set of three nozzles, each of which nozzles provides an hydraulic communication between the exterior of the housing and the interior of said second chamber, the nozzles defining respective axes, the axes of first and second nozzles of said second set being coincident and extending orthogonally to said central axis of the housing and the axis of the third nozzle of said second set being orthogonal to the axes of the first and second nozzles of the second set;
a first obturator element for the first and second nozzles of said first set of nozzles, comprising two plane walls enclosing a predetermined angle to form an edge which is substantially orthogonal to the common axis of the first and second nozzles of said first set of nozzles, said first obturator element being arranged to rotate about an axis orthogonal to the common axis of the first and second nozzles of said first set of nozzles from a first position in which one of said plane walls is in contact with the edge of the first nozzle of said first set of nozzles and forms a right angle with the axis of the nozzle itself and the other plane wall of said first obturator element acts as a deflector to cause fluid entering the first chamber from the third nozzle of said first set of nozzles to change direction and be deflected towards the second nozzle of said first set of nozzles, to a second position in which said other plane wall is in contact with the edge of the second nozzle of said first set of nozzles and forms a right angle with the axis of the nozzle itself and said one plane wall of said first obturator element acts as a deflector to cause fluid entering the first chamber from the third nozzle of said first set of nozzles to change direction and be deflected towards the first nozzle of said first set of nozzles; and
a second obturator element for the first and second nozzles of said second set of nozzles, comprising two plane walls enclosing a predetermined angle to form an edge which is substantially orthogonal to the common axis of the first and second nozzles of said second set of nozzles, said second obturator element being arranged to rotate about an axis orthogonal to the common axis of the first and second nozzles of said second set of nozzles from a first position in which one of said plane walls is in contact with the edge of the first nozzle of said second set of nozzles and forms a right angle with the axis of the nozzle itself and the other plane wall of said second obturator element acts as a deflector to cause fluid entering the second chamber from the third nozzle of said second set of nozzles to change direction and be deflected towards the second nozzle of said second set of nozzles, to a second position in which said other plane wall is in contact with the edge of the second nozzle of said second set of nozzles and forms a right angle with the axis of the nozzle itself and said one plane wall of said second obturator element acts as a deflector to cause fluid entering the second chamber from the third nozzle of said second set of nozzles to change direction and be deflected towards the first nozzle of said second set of nozzles.

2. A six-way deviator valve as claimed in claim 1, wherein each of said obturator elements comprises a rotating spindle driven by control means and connected to said walls by means of a resilient lamination parallel to the axis of said spindle, stop means being provided on the spindle which are arranged to limit, by a predetermined amount, the flexional deformation of said lamination with respect to the spindle.

3. A six-way deviator valve as claimed in claim 2, wherein said lamination has two parallel end edges of which one is fastened to said spindle and of which the other is connected to a support element for said walls, said walls being arranged to effect small oscillations with respect to said support element.

4. A six-way deviator valve as claimed in claim 2, wherein said control means comprise a link block rigidly connected to said spindle and having an inner edge arranged to cooperate with the outer surface of a rotatable eccentric rigidly connected to a manually controlled handwheel, the centre of rotation of said eccentric being positioned so that upon rotation thereof the outer surface of said eccentric cooperates with said edges of the link block to produce a rotation of the latter about the axis of said spindle.

5. A six-way deviator valve as claimed in claim 4, wherein the inner edge of said link block comprises a pair of parallel sections and said eccentric is circular in shape.

6. A six-way deviator valve as claimed in claim 1, wherein the axes of the respective third nozzles of said first and second sets of nozzles are disposed on the same generatrix of said housing, and the rotational axes of the two obturator elements are coincident and are parallel to said central axis of the housing.

7. A six-way deviator valve as claimed in claim 6, wherein the first and second obturator elements are mounted on a common drive shaft.

8. A six-way deviator valve as claimed in claim 1, wherein the respective third nozzles of said first and second sets of nozzles are located in diametrically opposite positions with respect to said housing, and the rotational axes of the two obturator elements are parallel to each other and to the axis of the housing and are disposed in diametrically opposite positions with respect to said housing.

9. A six-way deviator valve as claimed in claim 8, wherein the first and second obturator elements are mounted on respective shafts, the valve further comprising linkage means connecting the shafts to rotate in unison.

10. A six-way deviator valve as claimed in claim 1, wherein the axes of the respective third nozzles of the first and second sets of nozzles are parallel to the axis of the housing, and the rotational axes of the obturator elements are orthogonal to said central axis of the housing.

11. A six-way deviator valve as claimed in claim 10, wherein the first and second obturator elements are mounted on respective shafts, the valve further comprising linkage means connecting the shafts to rotate in unison.

* * * * *